June 4, 1935.  G. GROSSET ET AL  2,003,881

AUTO COLLIMATED OBJECTIVE FOR COLOR PHOTOGRAPHY

Filed Aug. 14, 1933

Inventors,
Georges Grosset,
Victor Hudeley, and
Jean Lagrave.

By William C. Linton.
Attorney.

Patented June 4, 1935

2,003,881

UNITED STATES PATENT OFFICE 2,003,881

AUTO-COLLIMATED OBJECTIVE FOR COLOR PHOTOGRAPHY

Georges Grosset, Montreuil Sous Bois, Victor Hudeley, Clichy, and Jean Lagrave, Paris, France Application August 14, 1933, Serial No. 685,132
In Luxemburg August 16, 1932

1 Claim. (Cl. 88—57)

Our invention relates to color photography and the taking and projection of colored pictures using lenticulated film, and is directed to the employment of a simple unitary optical system with lenticulated film which will produce clear undistorted images.

An object of our invention is to provide a self-collimating objective lens system which will produce a clear image with lenticular films without employing a separate collimating lens.

A further object of our invention is to provide an objective system wherein the diaphragm or trichrome screen is positioned in the entrance pupil, and the exit pupil is at infinity.

Figure 1:
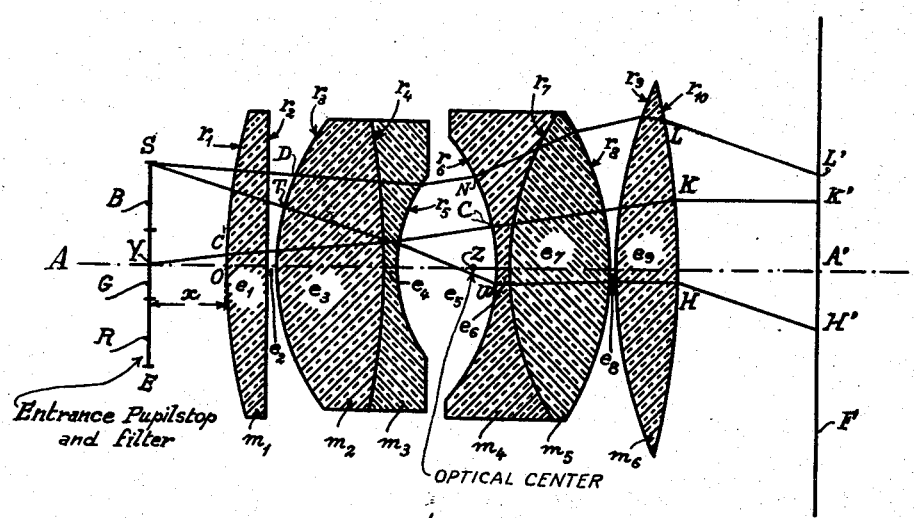
Figure 2:
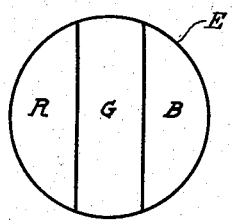

Our invention will be understood from the following specification and the accompanying drawing wherein:

Fig. 1 shows an example of the self-collimating lens system of our invention, and Fig. 2 shows the tri-chrome screen employed in our system for photographing colors.

It is well known that each of the elements obtained by embossing lens elements on the rear side of a photographic film, especially according to the method described in the Berthon French Patent No. 399,762 delivered May 3, 1909, forms an image of the tri-chrome screen on the photographic emulsion of the film.

In order to insure a proper projection of a color film and its correct reproduction it is necessary to secure the optical centering of the images of the tri-chrome screen behind the lenticular elements which produce these images.

The difficulties herein involved are due to the fact that the different lens elements of the film base function under different optical conditions according as they are positioned on the axis of the optical system or at the edge of the field. The placing close to the sensitive film of a collimating lens having its focus in the vicinity of the objective, does not in general avoid these difficulties, since ordinarily the collimating lens with the objective will not form a perfect optical system.

Even if a collimating lens is placed in the focal plane of the objective, and the collimating lens has such a focal length that the exit pupil of the original objective is in the focal foreplane of the collimating lens, various aberrations and distortions are introduced. The effort to introduce compensating aberrations into such an objective, to compensate for the aberrations inherent in the collimating lens, is not satisfactory.

The collimator lens mounted adjacent to the objective which takes the views is an incomplete solution of the problem for these reasons:

1. For each objective of different focal length there must be a separate corresponding collimator lens, and 2. The addition of a collimator lens produces aberrations which render the image obtained blurred and unsatisfactory, involving astigmatism, curvature of field, and distortion, which cannot be compensated by a single collimating lens.

The use of a separate collimating lens has the disadvantage that every time the focus of the objective is changed, the collimating lens must be changed.

The auto-collimated objective of our invention represents an ideal solution under the express condition that all aberrations are perfectly corrected.

It is furthermore necessary that the objective embodies the following conditions:

1. The exit pupil should be at infinity, and

2. The selecting screen or the effective diaphragm should be in the neighborhood of the front lens of the objective.

Indeed, in order to avoid a prohibitive diameter of the front lens, and in view of the great angle of the field of the objectives taking the views, it is indispensable to reduce as much as possible the distance between the filter or screen and the front lens.

The present invention has for an object a particular type of objective lens system which conforms to these different conditions and provides an automatic realization of the collimation of reticulated films when taking views.

This objective lens system of our invention presents as an essential characteristic the feature of being provided with an effective diaphragm in the neighborhood of the front lens, and has its exit pupil situated at infinity. This objective of our invention is rendered achromatic for three wave lengths and is fully corrected with regard to spherical aberration, astigmatism, coma, and distortion, by introducing the precise abscissa of the entrance pupil with reference to the optical origin at the lens vertex into the design equations of the objective system.

Furthermore, by employing a particular mode of assembling the different elements of our objective system, the equation representing the condition of Petzval is made equal to zero, and a remarkable evenness or planeness of the field is obtained.

The relative opening of our objective is smaller than or equal to F:2.

As an example which is in no way limitative, the characteristics are given below of an objective embodying the principles of our invention, which is self-collimated, and has a focal length of 100 millimeters and a relative opening F:2.

The drawing shows the assembling of the elements of this objective. This objective system is provided with lenses $m_1$, $m_2$, $m_3$, $m_4$, $m_5$, and $m_6$. In front of the first lens $m_1$ there is arranged the tri-chrome screen or a suitable diaphragm E.

The respective thicknesses of the lenses and the intervening air spaces are shown respectively as $e_1$, $e_2$, $e_3$, $e_4$, $e_5$, $e_6$, $e_7$, $e_8$, $e_9$.

The respective radii of curvature of the lenses are shown as $r_1$, $r_2$, $r_3$, $r_4$, $r_5$, $r_6$, $r_7$, $r_8$, $r_9$, $r_{10}$. AA' is the optical axis of the system. In the optical design equations, the origin is taken at the vertex O of the first lens $m_1$. In both Fig. 1 and Fig. 2, R, G, and B, respectively represent the red, green, and blue, zones of the tri-chrome screen E. F is the film to be exposed, which is placed behind the lens $m_6$. Z is the optical center of the system of objective lenses.

By selecting glass of the proper refractive index for each of the several lenses, and properly choosing the radii of curvature and the spacing of the lenses, the condition will be obtained that a ray originating at any point of the screen E will pass through the lens system in such a manner that it will emerge from the last lens parallel to the line joining the originating point to the optical center of the lens system.

Fig. 1 shows the ray paths for a system of lenses whose constants are given in the appended table and which we have found to give good results. A ray starting from the point Y where the optical axis AA' intersects screen E, is incident upon lens $m_1$ and is successively refracted, passes through point C, and emerges from the last lens at K so that the emerging ray KK' is parallel to the optical axis, which in this case is the line joining the originating point Y to the optical center.

A ray such as SH' starting from point S of screen E, off the optical axis AA', is successively refracted, passes through points T, U, H, and emerges as the ray HH' parallel to the line SZ joining the originating point to the optical center. Similarly the ray SL' starting from point S, is successively refracted, passes through points D, N, L, and emerges as the ray LL' parallel to the same line SZ joining the originating point to the optical center. In Fig. 1, the point S has been taken as 20 millimeters from the optical axis, and the entrance pupil as 46 millimeters.

The following are the design constants, in millimeters or other suitable units, of the several elements of our particular embodiment of an objective system here referred to, and shown in the Fig. 1, which arrangement we have found to give good results and to place the exit pupil at infinity:

| Lens | Radii of curvature | Thickness | Refractive index (D line) |
|---|---|---|---|
| $m_1$ | $r_1 = +115$<br>$r_2 = +\text{infinity}$ | $e_1 = 8$ | 1.60754 |
| $m_2$ | $r_3 = +45$<br>$r_4 = -150$ | $e_2$ (air) = 2<br>$e_3 = 21$ | 1.60754 |
| $m_3$ | $r_4 = -150$<br>$r_5 = +30$ | $e_4 = 2.5$ | 1.60357 |
| $m_4$ | $r_6 = -39$<br>$r_7 = +53.2$ | $e_5$ (air) = 20<br>$e_6 = 2.5$ | 1.58103 |
| $m_5$ | $r_7 = +53.2$<br>$r_8 = +55$ | $e_7 = 20$ | 1.60754 |
| $m_6$ | $r_9 = +90$<br>$r_{10} = -150$ | $e_8$ (air) = 1<br>$e_9 = 12$ | 1.60754 |

Distance of tri-chrome screen E to the entrance vertex of lens $m_1$, 15 millimeters.
Opening F=2.3.
Focal length, 100 millimeters.

The distance between the screen or diaphragm E and the front lens $m_1$ has been reduced as much as possible, and is equal to 15 millimeters.

The arrangement of these lenses as described has been found by us to be particularly desirable because it avoids the phenomenon known as cat's eye, which is especially undesirable when using reticulated film.

It is obvious that our invention may be modified according to the requirements of any particular case, and the principles of our invention may be applied in apparatus of other specific types than those specifically set forth herein.

We claim:

An objective lens system comprising six lens elements, $m_1$, $m_2$, $m_3$, $m_4$, $m_5$, $m_6$, arranged in order, the element $m_1$ being the entrance element, said lens elements having respective thicknesses in given units of substantially the values for $m_1$, 8; $m_2$, 21; $m_3$, 2.5; $m_4$, 2.5; $m_5$, 20; $m_6$, 12; said lens elements having respective refractive indices of substantially the values for $m_1$, $m_2$, $m_5$, $m_6$, of 1.60754; for $m_3$ of 1.60357; for $m_4$ of 1.58103; said lens element $m_2$ being spaced from said lens element $m_1$ by an axial space of substantially 2 of said given units, said lens element $m_4$ being spaced from said lens element $m_3$ by an axial space of sustantially 20 of said given units, said lens element $m_6$ being spaced from said lens element $m_5$ by an axial space of 1 of said given units; the entrance and exit radii of curvature of each of said lens elements having substantially the respective values in said given units, for $m_1$, +115 and + infinity; $m_2$, +45 and −150; $m_3$, −150 and +30; $m_4$, −39 and +53.2; $m_5$, +53.2 and +55; $m_6$, +90 and −150.

GEORGES GROSSET.
VICTOR HUDELEY.
JEAN LAGRAVE.